March 24, 1970     E. GRUNEWALD     3,502,090
DISHWASHING APPARATUS
Filed Dec. 14, 1967
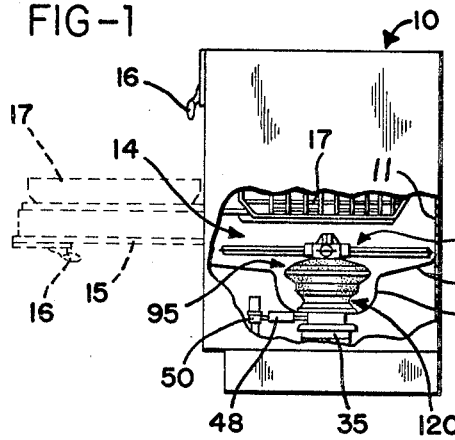
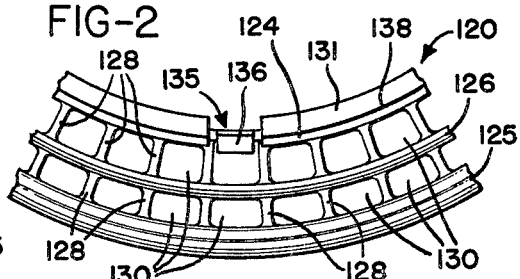
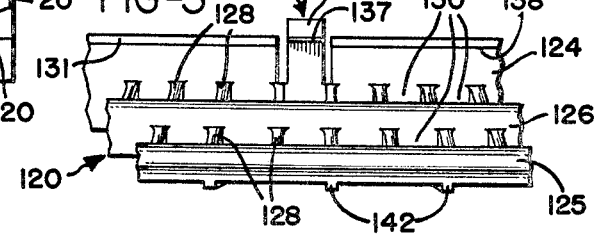
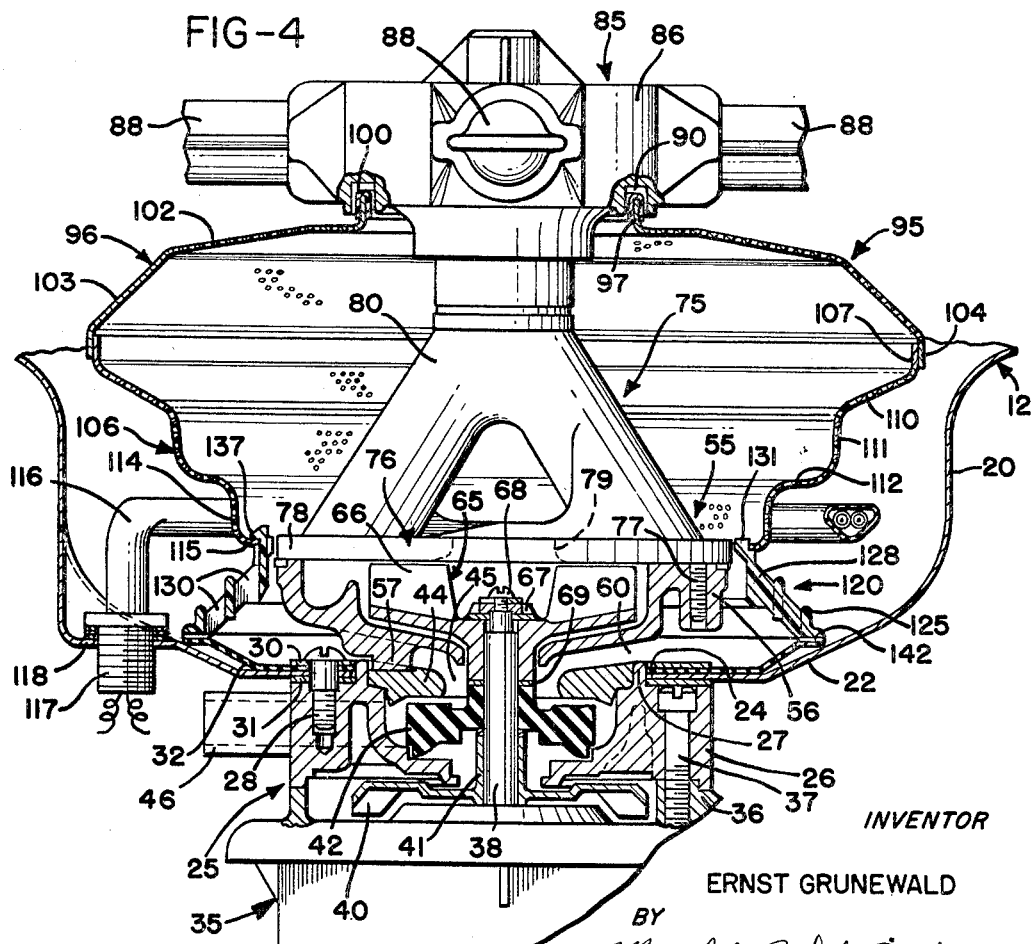
INVENTOR
ERNST GRUNEWALD
BY
*Marechal, Biebel, French & Bugg*
ATTORNEYS

United States Patent Office 3,502,090
Patented Mar. 24, 1970

3,502,090
DISHWASHING APPARATUS
Ernst Grunewald, Troy, Ohio, assignor to The Hobart Manufacturing Company, Troy, Ohio, a corporation of Ohio
Filed Dec. 14, 1967, Ser. No. 690,516
Int. Cl. B01d 29/04, 39/12
U.S. Cl. 134—111          8 Claims

ABSTRACT OF THE DISCLOSURE

A dishwashing machine has a tank with a bottom sump in which is positioned a main pump operable to recirculate water through a rotatable reaction spray arm and over articles supported by racks within the chamber. A drain pump has a top inlet connected to the bottom of the sump and both pumps are driven by a vertically positioned motor. A removable annular fine filter has an inverted generally frusto-conical lower portion which surrounds the inlet of the main pump and an annular frusto-conical coarse filter is disposed under the fine filter surrounding the inlet of the drain pump and has an upper portion secured to the lower portion of the fine filter.

BACKGROUND OF THE INVENTION

In a dishwashing machine such as disclosed in Geiger et al. No. 3,323,529 which issued to the assignee of the present invention, it is desirable to employ an annular fine strainer or filter surrounding the top inlet of the main recirculating pump to prevent the redeposit of food particles onto the articles supported by the racks within the wash chamber. As disclosed in the above patent, preferably the fine filter has an upper portion which projects above the dynamic water level to provide for effective self-flushing or cleaning of the upper portion of the fine filter while water is being recirculated. It is also desirable to provide a coarse strainer or filter in the flow path of water to the inlet of the drain pump to prevent large insoluble objects such as toothpicks, bones, fruit pits, etc. from entering the drain pump or the drain control valve or from being pumped into a waste disposer where the drain line of a dishwasher is commonly attached or directed.

To provide for convenient removal of both the fine and coarse filters for occasional cleaning, it is desirable to mount the reaction spray arm so that it can be merely lifted from its rotatable support after which the filters can be lifted from the sump. For further simplifying the removal, cleaning and replacement of the filters, it has been found desirable to secure the coarse filter to the fine filter so that both filters can be quickly and easily removed as a unit and to construct the coarse filter so that any foreign objects will be carried with the coarse filter when it is removed from the sump.

SUMMARY OF THE INVENTION

The present invention is directed to an improved filtering system for a dishwashing machine as outlined above, and as one feature provides a fine filter having a lower portion which is connected to the upper portion of a coarse filter and thereby provides for convenient removal, cleaning and replacement of the filters. Preferably, the fine filter has a lower portion with an inverted frusto-conical step-like configuration which provides not only substantial filtering area but also effective self-cleaning as water is drained from the wash chamber. The coarse filter is preferably formed of a suitable plastic and has a generally frusto-conical configuration with its upper portion closely surrounding the main pump and its lower portion seated on the bottom of the sump.

The coarse filter has axially spaced concentric rings interconnected by radially extending ribs which define an annular array of vertically extending passageways which are so disposed in relation to the bottom of the sump that a long foreign object such as a toothpick or hairpin is prevented from flowing through the course filter and into the inlet of the drain pump. The vertical passageways within the coarse filter are also effective to produce a downwardly reverse flow through the lower portion of the fine filter during the drain period thereby providing an effective back flushing of the lower portion of the fine filter so that food particles do not collect on its outer surface. The construction of the coarse filter also provides for simplified and positive connection with the lower portion of the fine filter.

BRIEF DESCRIPTION OF THE DRAWINGS

FIG. 1 is a side elevational view of a typical dishwashing machine incorporating an improved filtering system constructed in accordance with the invention;

FIG. 2 is a fragmentary plan view of a portion of the coarse filter;

FIG. 3 is a fragmentary elevational view of the portion of the coarse filter shown in FIG. 2; and FIG. 4 is an enlarged fragmentary elevational view in part axial section of an assembled wash and drain system incorporating coarse and fine filters constructed and arranged in accordance with the invention.

DESCRIPTION OF THE PREFERRED EMBODIMENT

FIG. 1 shows a typical front loading type dishwasher including an outer cabinet indicated generally at 10 and which encloses a tank 11 having a bottom 12 and defining a wash chamber 14. Access to the wash chamber 14 is provided by a door 15 operable between a vertical closed position and a horizontal open position and which is adapted to be sealed tightly against the tank 11 by actuating a latch 16. Tableware and food preparing articles are supported within the wash chamber 14 by a set of racks 17 which are adapted to be moved out over the door 15 when in the open position for convenient loading and unloading. While a front loading type dishwasher is illustrated, it is to be understood that a filtering system constructed in accordance with the invention may be employed in other types of dishwashing machines, as for example, a top opening portable dishwasher.

As shown in FIGS. 1 and 4, the bottom 12 of the tank 11 slopes downwardly towards the center so that liquid collecting thereon drains into a sump 20 having a sloping bottom 22 with a centrally located circular opening 24. Mounted directly below the bottom 22 of the sump 20 is a drain pump 25 having an annular housing 26 which is located by an annular rib 27 extending upwardly through the opening 24 and is secured to the bottom 22 by a series of screws 28 extending through corresponding holes formed within a clamping plate 30, the bottom 22 and annular flat gaskets 31 and 32.

Mounted below the drain pump 25 is a motor 35 having a top bearing bracket 36 which is provided with threaded holes to receive retaining screws 37 extending through the housing 26. The motor 35 has a vertical shaft 38 which supports a centrifugal fan impeller 40 having a cylindrical hub portion 41. The upper end of the hub portion 41 forms a seat for the hub of a resilient flexible vane drain pump impeller 42 mounted on the shaft 38 within the housing 26.

An annular cover 44 is mounted on the upper portion of the drain pump housing 26 and seats within the annular rib 27 to define an annular inlet 45 for the drain pump housing 26 which has a tubular portion 46 defining an outlet. Referring to FIG. 1, a flexible drain line 48 is connected to the outlet of the drain pump and is provided with a suitable solenoid actuated drain valve 50. The drain line 48 is commonly connected to an adapter tube projecting from a waste disposer.

Mounted above the bottom 22 of the sump 20 is a main recirculating pump 55 having a housing 56 including four legs 57 which seat on the annular top cover 44 for the drain pump housing 26 and define therebetween drain passageways 60 extending generally radially inwardly to the drain pump inlet 45. A series of four uniformly spaced screws (not shown) extend through the legs 57 and are threaded into the drain pump housing 26 sandwiching therebetween the drain pump cover 44.

An open type centrifugal impeller 65 with upwardly projecting vanes 66 is mounted within the main recirculating pump housing 56 on the upper end of the motor shaft 38 and is rigidly secured to the shaft by a drive washer 67 and a retaining screw 68. The bottom end surface of the impeller 65 drives the drain pump impeller 42 through an interfitting connection 69.

A manifold 75 forms a part of the main recirculating pump 55 and has a lower circular base portion 76 which is secured to the upper surface of the housing 56 by a series of screws 77. The lower base portion 76 has a cylindrical peripheral surface 78 and is formed with a centrally located circular inlet opening 79. The manifold 75 has an inverted Y-shaped conduit 80 which supports an internal vertical shaft (not shown).

A reaction spray arm 85 constructed substantially as shown in the above patent, includes a hub portion 86 rotatably mounted on the upper cylindrical portion of the manifold 75 and the shaft therein. A series of four uniformly spaced spray tubes 88 extend horizontally from the spray arm hub 86 and each tube is provided with a plurality of nozzle outlets (not shown) on its upper surface for spraying water over the articles supported within the rack 17. An annular groove 90 is formed in the bottom surface of the spray arm hub 86.

An annular fine strainer or filter 95 formed entirely of finely perforated sheet metal, surrounds the manifold 80 and the pump inlet 79 and includes an upper portion 96 having a cylindrical lip 97 which projects upwardly into the groove 90 within the spray arm hub 86. The upper cylindrical lip 97 of the fine filter 95 has a low friction plastic covering 100 and provides a labyrinth type seal as explained in the above patent.

The annular perforated wall of the upper portion 96 of the fine filter 95 includes a portion 102 which extends outwardly and slightly downwardly from the lip 97 to join a portion 103 which extends further outwardly and slopes downwardly at a steeper angle to join a cylindrical lip 104. The fine filter 95 has an annular lower portion 106 with generally frusto-conical configuration and including an upper cylindrical lip 107 which is secured to the lip 104 by peripherally spaced spot welds. The perforated wall of the lower portion 106 includes a portion 110 which extends downwardly and inwardly from the lip 107 at an angle of approximately 45° and curves into a short cylindrical portion 111 which, in turn, curves into a radially inwardly extending portion 112. A cylindrical portion 114 having a diameter smaller than the cylindrical portion 111, extends downwardly from the radial portion 112 to a radially inwardly extending lip 115. The stepped-like cross-sectional configuration of the lower filter portion 106 provides substantial surface area for filtering and also provides for effective back flushing of the fine filter during the drain period as will be explained later. In addition, the step-like cross-sectional configuration provides space for mounting an electrical heating element 116 having terminals 117 secured to a recess portion 118 of the sump bottom 22.

A coarse strainer or filter 120 formed of a suitable heat resistant plastic, is positioned below the fine filter 95 and has a generally frusto-conical configuration which is formed by three axially spaced concentric generally cylindrical rings including an inner ring 124, an outer ring 125 and an intermediate ring 126. The rings 124–126 are rigidly connected by circumferentially spaced radial ribs 128 which cooperate with the rings to define vertically or axially extending drain passageways 130 through which the water within the sump 20 must flow to reach the drain pump inlet 45. The inner ring 124 of the coarse filter includes an inwardly projecting upper flange 131 which closely surrounds the outer cylindrical surface 78 of the manifold base 76.

Four uniformly spaced hook-shaped tabs 135 interrupt the flange 131 and project upwardly from the inner ring 124. Each tab 135 has an upper cam surface 136 and a downwardly facing shoulder 137. As shown in FIG. 4, the upper portion of the coarse filter 120 is secured to the lower portion 106 of the fine filter 95 by means of the tabs 135 engaging the radial lip 115 which seats within a peripheral shoulder 138 formed at the top of the inner ring 124. The filters 95 and 120 are assembled merely by pressing the fine filter 95 downwardly against the top of the coarse filter 120 causing the tabs 135 to be cammed inwardly until they snap outwardly to engage the lip 115. As shown in FIG. 4, the outer ring 125 has a series of radially extending bottom ribs 142 which seat on the upper surface of the resilient gasket 32 to define drain passageways therebetween. The upper rims of the intermediate ring 126 and outer ring 125 of the coarse filter 120 project above the adjacent portion of the radial ribs 138 to provide for catching and retaining foreign objects on the upper surface of the coarse filter 120.

In operation, water is introduced into the wash chamber 14 through a suitable solenoid actuated fill valve (not shown) and is recirculated within the chamber 14 through the spray arm 85 by operation of the main pump 55. The dynamic water lever is maintained on the annular wall portion 103 of the fine filter 95 so that the upper portion 96 of the fine filter is continuously flushed by recirculated water which flows primarily through the lower portion 106 of the fine filter 95 to the inlet 79 of the main pump 55. The insoluble food particles and other objects such as toothpicks, fruit pits, etc. are blocked by the fine filter 95 and the heavier objects will descend onto the upper surface of the coarse filter 120. The foreign objects which are too large to flow through the passageways 130 within the coarse filter 120 are retained on the upper sloping surface of the filter by the projecting rims of the rings 125 and 126 and are thereby prevented from entering the drain pump 25 or drain valve 50 or the waste disposer to which the drain line 48 is connected. After several foreign objects have collected on the coarse filter 120 and its is desirable to clean the filter, the spray arm 85 is merely lifted from the supporting manifold 75 after which the assembled fine filter 95 and coarse filter 120 can be easily lifted and removed as a unit.

The filtering system of the invention provides several additional features and advantages. For example, the vertically extending passageways 130 within the coarse filter 120 cooperate with the sump bottom 22 to assure that the long insoluble object such as a toothpick will not flow through the coarse filter 120 and into the inlet of the drain pump 25. In addition, the vertically extending passageways 130 are effective to produce a downward flow of water during draining of the sump for back flushing the lower portion 106 of the fine filter 95 and producing a downward flow adjacent its outer surface which also aids in cleaning the fine filter 95.

As mentioned above, the assembly of the upper portion of the coarse filter 120 to the lower portion of the fine filter 95 provides or convenient removal of the coarse filter 120 for cleaning. Furthermore, the seating of the ribs 142 on the sump bottom 22 and the seating of the self-locating flange 131 of the inner ring 124 around the periphery of the main pump 55 assures that the coarse and fine filter assembly is properly positioned when the filter assembly is placed back within the sump after cleaning. The step-like configuration of the lower portion 106 of the fine filter 95 further provides the additional advantage of a large surface area so that the fine filter 95 provides an effective filtering action.

While the form of apparatus herein described constitutes a preferred emlodiment of the invention, it is to be understood that the invention is not limited to his precise form of apparatus, and that changes may be made therein without departing from the scope of the invention.

What is claimed is:

1. In a dishwashing machine including a tank defining a cleansing chamber and having a sump at the bottom, at least one rack for supporting articles within said chamber, a main recirculating pump mounted within said sump and having an inlet, a drain pump mounted below said sump and having an inlet connected to said pump, and a motor connected to drive said pumps, an improved filtering system comprising a removable annular perforated fine filter having a lower portion surrounding said inlet of said main pump, an annular generally frusto-conical coarse filter positioned below said lower portion of said fine filter and surrounding said inlet of said drain pump, said fine and coarse filters being removable from said sump without disassembling said main pump, means defining an annular array of passageways within said coarse filter, said coarse filter having means for retaining relatively large food particles flushed downwardly from the outer surface of said fine filter, and means securing an upper portion of said coarse filter to said lower portion of said fine filter to effect removal of said coarse filter with the removal of said fine filter and to provide for convenient cleaning of said filters.

2. A dishwashing machine as defined in claim 1 wherein said coarse filter includes inner and outer generally cylindrical concentric rings in axially spaced relation, means including generally radially extending ribs connecting said rings and cooperating therewith to define said passageways, and means connecting said inner ring to said lower portion of said fine filter.

3. A dishwashing machine as defined in claim 2 wherein said coarse filter includes an intermediate ring concentric with and spaced between said inner and outer rings, and said outer and intermediate rings each having an upper rim portion projecting above the adjacent portion of said ribs for retaining foreign objects thereon.

4. A dishwashing machine as defined in claim 2 wherein said fine filter includes an inverted generally frusto-conical said lower portion, and said rings and ribs cooperating to define generally axially extending said passageways disposed under said lower portion of said fine filter to provide effective cleaning of said fine filter while draining said sump.

5. A dishwashing machine as defined in claim 2 wherein said coarse filter includes a plurality of generally radially extending ribs projecting downwardly from said outer ring, and said ribs being disposed to seat on the bottom of said tank and to provide drainage between said outer ring and the bottom of said tank.

6. A dishwashing machine as defined in claim 1 wherein said fine filter is formed of perforated sheet metal and includes a radially inwardly extending bottom flange, said coarse filter is formed of plastic and includes flexible clip means formed as an integral part thereof for engaging said bottom flange.

7. A dishwashing machine as defined in claim 1 wherein said annular fine filter includes an inverted generally frusto-conical said lower portion having a step-like cross-sectional configuration to provide substantial filtering area, and said annular coarse filter is disposed below said lower portion of said fine filter within said sump so that said coarse filter is prevented from interfering with the flow of water through said fine filter to said main pump.

8. In a dishwashing machine including a tank defining a cleansing chamber and having a sump at the bottom, at least one rack for supporting articles within said chamber, a main recirculating pump mounted within said sump and having an inlet, a drain pump mounted below said sump and having an inlet connected to said sump, and a motor connected to drive said pumps, an improved annular coarse filter removably positioned within said sump and surrounding said inlet of said drain pump, said coarse filter having a generally frusto-conical configuration and an annular array of axially extending passageways formed by a plurality of axially spaced generally cylindrical concentric rings connected by generally radially extending ribs, the upper said ring of said filter closely surrounding said main pump, and the lower said ring disposed adjacent the bottom of said sump.

References Cited

UNITED STATES PATENTS

| | | | |
|---|---|---|---|
| 1,761,257 | 6/1930 | Fleming | 210—497 XR |
| 2,054,797 | 9/1936 | Franklin | 134—110 |
| 3,084,701 | 4/1963 | Hardy et al. | 134—188 XR |
| 3,126,025 | 3/1964 | Aubert et al. | 134—111 XR |
| 3,323,529 | 6/1967 | Geiger et al. | 134—104 |
| 3,335,867 | 8/1967 | Perl | 134—111 XR |
| 3,370,598 | 2/1968 | Lopp et al. | 134—111 |

ROBERT L. BLEUTGE, Primary Examiner

U.S. Cl. X.R.

134—188; 210—167, 497